(12) United States Patent
Xu

(10) Patent No.: US 12,051,142 B2
(45) Date of Patent: Jul. 30, 2024

(54) MEME PACKAGE GENERATION METHOD, ELECTRONIC DEVICE, AND MEDIUM

(71) Applicant: BEIJING BAIDU NETCOM SCIENCE AND TECHNOLOGY CO., LTD., Beijing (CN)

(72) Inventor: Chuanren Xu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 422 days.

(21) Appl. No.: 17/471,086

(22) Filed: Sep. 9, 2021

(65) Prior Publication Data

US 2021/0407166 A1 Dec. 30, 2021

Related U.S. Application Data

(63) Continuation of application No. PCT/CN2020/133649, filed on Dec. 3, 2020.

(30) Foreign Application Priority Data

Jun. 28, 2020 (CN) .......................... 202010601966.6

(51) Int. Cl.
*G06T 13/80* (2011.01)
*G06F 16/732* (2019.01)
(Continued)

(52) U.S. Cl.
CPC .......... *G06T 13/80* (2013.01); *G06F 16/7328* (2019.01); *G06F 16/739* (2019.01);
(Continued)

(58) Field of Classification Search
CPC . G06T 13/80; G06T 2200/24; G06F 16/7328; G06F 16/739; G06F 16/7837;
(Continued)

(56) References Cited

U.S. PATENT DOCUMENTS

2008/0209320 A1* 8/2008 Mawhinney ...... G06F 16/24578
715/700
2009/0192896 A1* 7/2009 Newton ............. G06Q 30/0224
707/999.107

(Continued)

FOREIGN PATENT DOCUMENTS

| CN | 106358087 A | 1/2017 |
| CN | 106951856 A | 7/2017 |

(Continued)

*Primary Examiner* — Jitesh Patel
(74) *Attorney, Agent, or Firm* — MASCHOFF BRENNAN; Younghwan Lee; Liang Huang

(57) ABSTRACT

A computer-implemented method is provided. The method includes: acquiring at least one piece of target feedback information for a plurality of related videos associated with a target video, the target video and the plurality of related videos are related to the same video producer; matching the at least one piece of target feedback information with the target video; determining at least one target video clip from the target video based on a matching result; and generating a meme package at least based on the at least one target video clip, the meme package being particular to the video producer.

18 Claims, 4 Drawing Sheets

(51) Int. Cl.
    *G06F 16/738*     (2019.01)
    *G06F 16/78*     (2019.01)
    *G06F 16/783*     (2019.01)
    *G06F 18/22*     (2023.01)
    *G06F 40/30*     (2020.01)
    *G06V 20/40*     (2022.01)
    *H04L 67/55*     (2022.01)

(52) U.S. Cl.
    CPC ...... *G06F 16/7837* (2019.01); *G06F 16/7867* (2019.01); *G06F 18/22* (2023.01); *G06F 40/30* (2020.01); *G06V 20/46* (2022.01); *H04L 67/55* (2022.05); *G06T 2200/24* (2013.01)

(58) Field of Classification Search
    CPC ...... G06F 16/7867; G06F 18/22; G06F 40/30; G06F 16/7844; G06F 16/735; G06F 16/7847; G06V 20/46; G06V 40/161; H04L 67/55; H04N 21/23418; H04N 21/26603; H04N 21/2743; H04N 21/8549; H04N 21/4312; H04N 21/4415; H04N 21/4668
    See application file for complete search history.

(56) References Cited

U.S. PATENT DOCUMENTS

| | | | |
|---|---|---|---|
| 2012/0102021 A1* | 4/2012 | Hill | G06F 16/9535 707/711 |
| 2014/0280531 A1* | 9/2014 | Liu | H04L 67/535 709/204 |
| 2015/0113013 A1 | 4/2015 | Rys et al. | |
| 2016/0080476 A1* | 3/2016 | Sandell | H04L 67/10 709/204 |
| 2016/0285803 A1* | 9/2016 | Strohl | G06F 3/04842 |
| 2016/0328877 A1* | 11/2016 | Cui | G06F 3/0482 |
| 2017/0185251 A1 | 6/2017 | Jain | |
| 2017/0193280 A1* | 7/2017 | Huang | G06F 16/784 |
| 2017/0372749 A1* | 12/2017 | Ramaswamy | G11B 27/34 |
| 2018/0025079 A1 | 1/2018 | Xiao et al. | |
| 2018/0025752 A1* | 1/2018 | Patel | H04N 5/77 386/240 |
| 2021/0264517 A1* | 8/2021 | Harris | G06Q 20/1235 |
| 2021/0312081 A1* | 10/2021 | Leekley | H04N 21/4755 |
| 2021/0357447 A1* | 11/2021 | McKenzie | G11B 27/34 |
| 2022/0300251 A1* | 9/2022 | Wang | G06F 3/167 |

FOREIGN PATENT DOCUMENTS

| | | |
|---|---|---|
| CN | 108200463 A | 6/2018 |
| CN | 110049377 A | 7/2019 |
| CN | 110719525 A | 1/2020 |
| CN | 110889379 A | 3/2020 |
| CN | 110162670 B | 5/2020 |
| CN | 111753131 A | 10/2020 |
| EP | 3 579 140 A1 | 12/2019 |
| JP | 2014131276 A | 7/2014 |
| JP | 2018126567 A | 7/2016 |
| JP | 2019212290 A | 12/2019 |
| KR | 20190122250 A | 10/2019 |
| KR | 20190139751 A | 12/2019 |
| KR | 20190139962 A | 12/2019 |

* cited by examiner

S101

ACQUIRE THE AT LEAST ONE PIECE OF FEEDBACK INFORMATION FOR EACH OF THE PLURALITY OF RELATED VIDEOS — S1011

PERFORM SEMANTIC MATCHING ON A PLURALITY OF PIECES OF FEEDBACK INFORMATION FOR THE PLURALITY OF RELATED VIDEOS — S1012

DIVIDE THE PLURALITY OF PIECES OF FEEDBACK INFORMATION INTO A PLURALITY OF FEEDBACK INFORMATION GROUPS BASED ON A SEMANTIC MATCHING RESULT — S1013

DETERMINE, FROM THE PLURALITY OF FEEDBACK INFORMATION GROUPS, AT LEAST ONE FEEDBACK INFORMATION GROUP IN WHICH THE NUMBER OF PIECES OF FEEDBACK INFORMATION COMPRISED IS GREATER THAN A THRESHOLD AS A TARGET FEEDBACK INFORMATION GROUP — S1014

DETERMINE, BASED ON A PLURALITY OF PIECES OF FEEDBACK INFORMATION IN EACH OF THE TARGET FEEDBACK INFORMATION GROUPS, THE TARGET FEEDBACK INFORMATION CORRESPONDING TO THE TARGET FEEDBACK INFORMATION GROUP — S1015

Fig. 2

MEME PACKAGE GENERATION METHOD, ELECTRONIC DEVICE, AND MEDIUM

CROSS REFERENCE TO RELATED APPLICATION

The present application is a continuation under 35 U.S.C. 111(a) of PCT International Application No. PCT/CN2020/133649, filed on Dec. 3, 2020, which claims priority to Chinese patent application No. 202010601966.6 filed on Jun. 28, 2020, the entire contents of which are hereby incorporated by reference in their entirety for all purposes.

TECHNICAL FIELD

The present disclosure relates to the field of multimedia technologies, particularly to the field of video image processing, and more particularly to a meme package generation method, an electronic device, and a medium.

BACKGROUND

In recent years, with the rapid spread of smartphones and significant improvement in mobile network speeds, more and more users start to use video multimedia software. By using the multimedia software, users can upload videos produced by themselves, or watch videos uploaded by other users. During the production of a video, many users intend to select a suitable meme from a meme package and then add same to the video. During the watching of videos uploaded by other users, a user can make a comment, or select a suitable meme from a meme package and then add same to the comment, or post a comment by using only the suitable meme selected from the meme package.

SUMMARY

According to an aspect of the present disclosure, a computer-implemented method is provided, and the method includes: acquiring at least one piece of target feedback information for a plurality of related videos associated with a target video, wherein the target video and the plurality of related videos are related to the same video producer; matching the at least one piece of target feedback information with the target video; determining at least one target video clip from the target video based on a matching result; and generating a meme package at least based on the at least one target video clip, the meme package being particular to the video producer.

According to another aspect of the present disclosure, an electronic device is further provided, and the electronic device includes: one or more processors; and a memory storing one or more programs configured to be executed by the one or more processors, the one or more programs comprising instructions for performing operations including: acquiring at least one piece of target feedback information for a plurality of related videos associated with a target video, wherein the target video and the plurality of related videos are related to the same video producer; matching the at least one piece of target feedback information with the target video; determining at least one target video clip from the target video based on a matching result; and generating a meme package at least based on the at least one target video clip, the meme package being particular to the video producer.

According to another aspect of the present disclosure, a non-transitory computer-readable storage medium is further provided. The storage medium stores one or more programs comprising instructions that, when executed by one or more processors of a computing device, cause the computing device to perform operations including: acquiring at least one piece of target feedback information for a plurality of related videos associated with a target video, wherein the target video and the plurality of related videos are related to the same video producer; matching the at least one piece of target feedback information with the target video; determining at least one target video clip from the target video based on a matching result; and generating a meme package at least based on the at least one target video clip, the meme package being particular to the video producer.

BRIEF DESCRIPTION OF THE DRAWINGS

The drawings show some embodiments and form a part of this specification, and are used to explain example implementations of the embodiments together with a written description of this specification. The embodiments shown are merely for illustrative purposes and do not limit the scope of the claims. Throughout the drawings, identical reference signs denote similar but not necessarily identical elements.

FIG. 2 is a flowchart showing a method for acquiring at least one piece of target feedback information for a plurality of related videos according to some embodiments;

DETAILED DESCRIPTION

Figure 1:
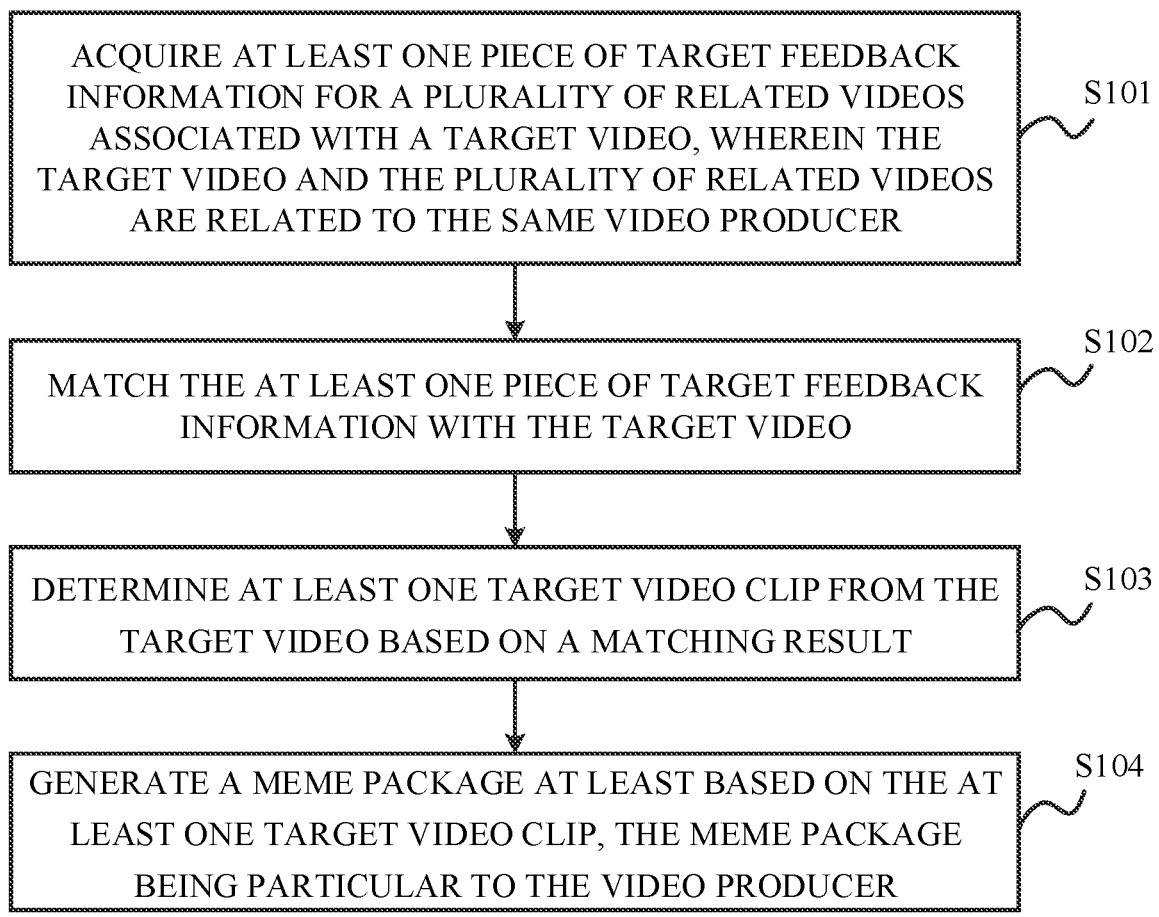
FIG. 1 is a flowchart showing a meme package generation method according to some embodiments.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. Moreover, the term "and/or" used in the present disclosure encompasses any of and all possible combinations of listed items.

In the related art, a multimedia platform pushes uniform meme packages to all users, and memes in these meme packages are mainly based on celebrities, anime, films, and television, etc. When commenting on or producing a video, users can only use memes in the uniformly pushed meme packages. Such uniform meme packages without differences have no association with a user who produces a video (hereinafter referred to as a video producer), and can only be used as memes.

Based on the research on big data, the inventor has appreciated that video clips related to comments that appears most frequently (which may refer to a plurality of comments with a relatively high semantic similarity) are generally video clips of interest to users. These video clips can draw most users' attention, and can usually best reflect the personality of the video producer. A video clip related to a comment may refer to a comment of another user on the video clip, or may refer to a video clip matching the comment. The video clip matching the comment may indicate that the comment has a relatively high semantic similarity with at least part of text corresponding to a subtitle or an audio of the video clip.

Based on this, the present disclosure provides a meme package generation method, in which target feedback information for a plurality of related videos related to a target video is obtained, and the target feedback information is matched with the target video, to determine at least one target video clip from the target video. Therefore, feedback information from users can be mapped into the target video to acquire a target video clip related to the feedback information from the users. The target video and the plurality of related videos are related to the same video producer. Then, a meme package of the video producer is generated based on the obtained target video clip. The meme package of the video producer may be pushed to the video producer and other users, so that other users can use a meme in the meme package to comment on a video uploaded by the video producer. The video producer can also select a suitable meme from the meme package and then add same to the produced video. By means of the foregoing technical solution, the generated meme package can be suited to the interest of other users, and can also reflect the personality of the video producer. Therefore, the meme package can be used to allow other users to have a deeper impression on the video producer, thereby enhancing the recognition and influence of the video producer.

Feedback information for a video may include, for example, at least one of the following pieces of information: a bullet screen comment, a comment in a video comment region, thumbs up, and repost.

The target video may be a live video, or a recorded video. For example, the target video and the plurality of related videos may be produced (may be live streamed or recorded) by the same user, for example.

In the present disclosure, a video produced by a user may refer to an audio and/or a video containing the user in the produced video.

The meme package generation method in the present disclosure is further described below with reference to the accompanying drawings.

FIG. 1 is a flowchart showing a meme package generation method according to some embodiments of the present disclosure. As shown in FIG. 1, the meme package generation method may comprise: step S101: acquiring at least one piece of target feedback information for a plurality of related videos associated with a target video, wherein the target video and the plurality of related videos are related to the same video producer; step S102: matching the at least one piece of target feedback information with the target video; step S103: determining at least one target video clip from the target video based on a matching result; and step S104: generating a meme package at least based on the at least one target video clip, the meme package being particular to the video producer.

The plurality of related videos may, but are not limited to, be obtained from a video library. For example, the plurality of related videos may also be obtained by means of crawling from the Internet.

According to some embodiments, at least one piece of feedback information in a plurality of pieces of feedback information for the plurality of related videos that appears most frequently may be respectively determined as the target feedback information. In other words, in the plurality of pieces of feedback information for the plurality of related videos, the number of times the at least one piece of target feedback information appears is greater than the number of times the remaining pieces of feedback information appear. Therefore, a target video clip of the greatest interest to users can be determined based on the at least one piece of target feedback information.

The target video clip may comprise a plurality of consecutive video frames, or may be a single video frame, which is not limited herein.

In some embodiments, as shown in FIG. 2, step S101 may comprise: step S1011: acquiring the at least one piece of feedback information for each of the plurality of related videos; step S1012: performing semantic matching on a plurality of pieces of feedback information for the plurality of related videos; step S1013: dividing the plurality of pieces of feedback information into a plurality of feedback information groups based on a semantic matching result; step S1014: determining, from the plurality of feedback information groups, at least one feedback information group in which the number of pieces of feedback information comprised is greater than a threshold as a target feedback information group; and step S1015: determining, based on a plurality of pieces of feedback information in each of the target feedback information groups, the target feedback information corresponding to the target feedback information group. Therefore, it is possible that the at least one piece of target feedback information is feedback information that appears most frequently.

For example, but without limitation, a keyword in the plurality of pieces of feedback information in each target feedback information group that has the highest semantic similarity may be used as the target feedback information. The keyword may be, for example, "666", "thumbs up", "get your back", etc. For example, one of the pieces of feedback information in each target feedback information group may also be determined as the target feedback information.

According to some embodiments, the meme package generation method may further comprise: before the acquiring the at least one piece of target feedback information for the plurality of related videos related to the target video, determining whether the total number of pieces of feedback information for the plurality of related videos is not less than a preset value; and pushing guidance information in response to determining that the total number of pieces of feedback information for the plurality of related videos is less than the set value, so as to guide a user to input feedback information for the target video. In response to determining that the total number of pieces of feedback information for the plurality of related videos is not less than the preset value, the acquiring of the at least one piece of target feedback information for the plurality of related videos may be implemented. In this way, required target feedback information can be acquired based on a sufficient number of pieces of feedback information, so that the obtained target feedback information can better indicate the interest of most users.

The pushing the guidance information may be, for example, posting a guidance bullet screen comment (for example, "Be ready for a torrent of bullet screen comments").

After the at least one piece of target feedback information for the plurality of related videos related to the target video is acquired, steps S102 and S103 can be performed to obtain the at least one target video clip. According to some embodiments, the at least one target video clip may match at least one of the at least one piece of target feedback information. A target video clip matches with target feedback information may refer to the case that in the target video, there is the highest semantic similarity between text corresponding to a subtitle or an audio of the target video clip and the target feedback information, and the score of the semantic similarity is greater than a set threshold. Correspondingly, step S102 may comprise: performing semantic matching between each of the at least one piece of target feedback information and text corresponding to at least part of a subtitle or at least part of an audio in the target video. The determining the at least one target video clip from the target video is performed based on a result of the semantic matching.

In the present disclosure, the meme package generated based on the target video clip may comprise an animated meme and/or a sticker particular to the video producer. The meme package may be pushed to other users and the video producer, such that other users, when watching a video uploaded by a video producer, can make a comment using a meme in the meme package of the video producer. The video producer can also add a meme in the meme package thereof during the production of a video.

By using the technical solution of the present disclosure, based on a video uploaded by each video producer, a meme package can be generated for the video producer.

Figure 3:
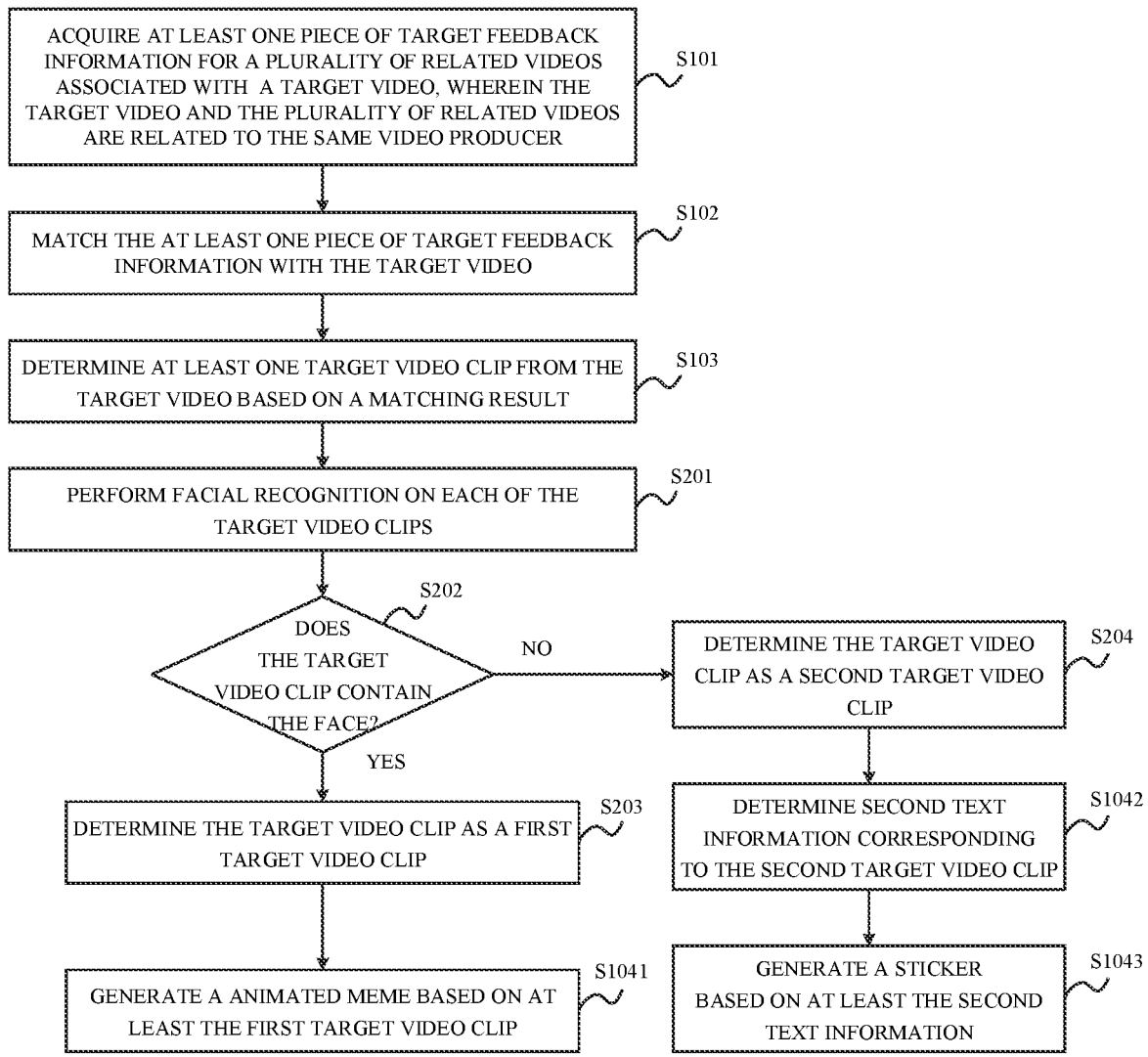
FIG. 3 is a flowchart showing a meme package generation method according to some embodiments.

According to some embodiments, the target video clip may comprise a first target video clip used to generate the animated meme. In this case, as shown in FIG. 3, the meme package generation method may further comprise: step S201: performing object recognition (for example, facial recognition) on each of the at least one target video clip before the generating the meme package; step S202: determining, based on an object recognition result, whether the target video clip contains a representation of the video producer; and step S203: determining, in response to determining that the target video clip contains a representation of the video producer, the target video clip as the first target video clip. Correspondingly, step S104 may comprise: step S1041: generating the animated meme based on at least the first target video clip. Therefore, the animated meme can be generated for the video producer based on the video clip containing the video producer, and the use of the animated meme can enhance the recognition of the video producer.

For example, when making some tasty food, a gastronome producer often says "Let's have something yummy today". The producer says it with an exaggerated expression and a hilarious tone, and users often make playful comments. By using the technical solution of the present disclosure, a corresponding animated meme can be generated based on the video clip (which may be a video clip corresponding to a subtitle or an audio "Let's have something yummy today"), and then pushed to the video producer and other users. By using the animated meme, the users who are watching can be greatly impressed, thereby facilitating rapid enhancement of the popularity of the producer.

According to some embodiments, the generating the animated meme based on at least the first target video clip in step S104 may comprise: determining first text information corresponding to the first target video clip; and generating the animated meme based on the first target video clip and the corresponding first text information. As such, the generated animated meme can be more vivid. The first text information may be determined based on text corresponding to a subtitle or an audio in the first target video clip. For example, the first text information may be text corresponding to a sentence in a corresponding subtitle or audio during the playing of the first target video clip. Certainly, the first text information may also be determined based on target feedback information matching the first target video clip.

Generating the animated meme based on at least the first target video clip may, but is not limited to, be performed in response to receiving a first trigger instruction, so that the animated meme can be selectively generated according to a trigger instruction from a video producer, thereby bringing about a better flexibility.

According to some embodiments, the target video clip may further comprise a second target video clip used to generate the sticker. In this case, as shown in FIG. 3, the meme package generation method may further comprise: step S204: determining, in response to determining that the target video clip does not contain a representation of the video producer (for example, not containing the face of the video producer), the target video clip as the second target video clip. Correspondingly, the generating the meme package in step S104 may further comprise: step S1042: determining second text information corresponding to the second target video clip; and step S1043: generating the sticker based on at least the second text information. Therefore, a sticker can be generated based on a video clip which does not contain the face. The second text information may be determined based on text corresponding to a subtitle or an audio in the second target video clip. For example, the second text information may be text corresponding to a sentence in a corresponding subtitle or audio during the playing of the second target video clip. Certainly, the second text information may also be determined based on target feedback information matching the second target video clip.

The generating the sticker based on at least the second text information may comprise: acquiring a facial image related to the target video; and generating the sticker based on the second text information and the facial image. Therefore, a sticker containing a facial image can be generated. For example, an avatar specified by a video producer, or an avatar of the video producer that is acquired from a target video may be used for the generated sticker. Therefore, the sticker including the avatar of the video producer can be generated, and the use of the sticker can enhance the recognition of the video producer.

It can be understood that a sticker may also be generated based on at least the first target video clip containing the face. The specific generation method is the same as for the second target video clip, which will not be repeated here.

In the foregoing content, a meme package is generated based on a target video clip that matches target feedback information.

According to some other embodiments, the meme package generation method may further comprise: generating, in response to receiving a second trigger instruction, a meme based on a preset video clip that is user selected, the meme being particular to the video producer. Therefore, a user can initiatively select a specified video clip to generate a meme (which may include a meme and/or a sticker, and the specific generation method of which is the same as that for generating a meme based on a target video clip in the foregoing content). The flexibility is higher, and the user experience can be further improved. For example, a one-key conversion icon may be displayed at a specified location of a video, such that a video producer can click on the one-key conversion icon to input the second trigger instruction.

The video producer may, but is not limited to, select a set video clip from a recorded video to generate the meme.

In the foregoing content, the case where the meme package, after the production of same is completed, can be pushed to the video producer and other users for selection and use is described.

According to some other embodiments, a suitable meme may also be automatically selected from the meme package and then added to a preset video. In this case, the meme package generation method may further comprise: matching one or more memes in the meme package with a preset video; determining, based on a matching result, at least one meme that matches the preset video; and determining, based on the matching result, at least one matching video clip in the preset video that matches respective ones of the at least one meme, so that during the playing of the preset video, a meme corresponding to a matching video clip is capable of being pushed while the matching video clip is played. Thus, an association is established between a preset video and a meme package, so that during the playing of a video, a corresponding meme can be automatically pushed while a matching video clip is played.

The preset video may be related to the target video. For example, the preset video and the target video may be related to the same video producer. Therefore, an association can be established between the preset video of the video producer and the meme package of the video producer, so that during the playing of the preset video, a corresponding meme can be automatically pushed.

The preset video may be a past video stored in a video library, or may be an acquired video currently uploaded by the video producer. A multimedia platform may acquire updated videos newly added to the video library at intervals, and match at least some of the memes in the meme package of the corresponding video producer with the newly added updated videos, such that an association can be established between a video uploaded by the video producer and the meme package thereof.

According to some embodiments, the meme package generation method may further comprise: establishing an association database for the meme package, wherein the association database comprises a correlation between the at least one meme and the at least one matching video clip. Therefore, a corresponding meme can be conveniently acquired from the association database and pushed in a subsequent process of playing the matching video clip.

In some embodiments, the meme package generation method may further comprise: acquiring play time information of the at least one matching video clip. The association database may further comprise a correlation between the at least one matching video clip and at least one piece of play time information (that is, at least one respective piece of play time information of the at least one of the matching video clips). Therefore, during the playing of the preset video, a corresponding meme can be pushed based on the play time information, such that a play time corresponding to the at least one meme can be quickly matched, thereby improving the pushing efficiency. The play time information may be a period of time for playing a corresponding matching video clip during the playing of the preset video.

Figure 4:
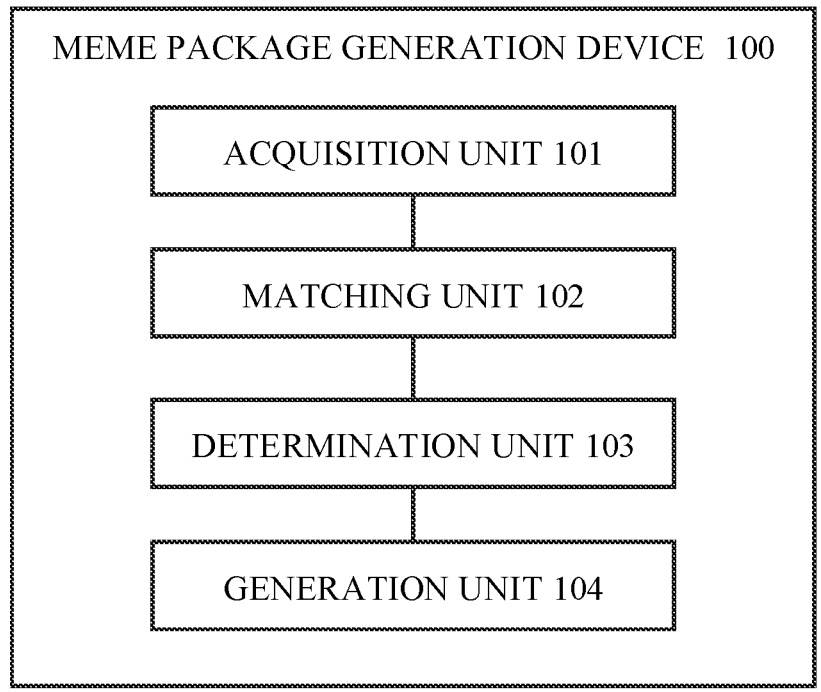
FIG. 4 is a schematic composition block diagram showing a meme package generation device according to some embodiments.

According to another aspect of the present disclosure, a meme package generation device is further provided. As shown in FIG. 4, a meme package generation device 100 may comprise: an acquisition unit 101 configured to acquire at least one piece of target feedback information for a plurality of related videos associated with a target video, wherein the target video and the plurality of related videos are related to the same video producer; a matching unit 102 configured to match the at least one piece of target feedback information with the target video; a determination unit 103 configured to determine at least one target video clip from the target video based on a matching result from the matching unit; and a generation unit 104 configured to generate a meme package at least based on the at least one target video clip, the meme package being particular to the video producer.

Herein, the operations of the foregoing units 101 to 104 of the meme package generation device 100 are respectively similar to the operations of steps S101 to S104 described above, which will not be repeated here.

According to another aspect of the present disclosure, an electronic device is further provided, which may comprise: a processor; and a memory that stores a program, the program comprising instructions that, when executed by the processor, cause the processor to perform the foregoing meme package generation method.

According to another aspect of the present disclosure, a non-transitory computer-readable storage medium storing a program is further provided, the program comprising instructions that, when executed by a processor of an electronic device, cause the electronic device to perform the foregoing meme package generation method.

Figure 5:
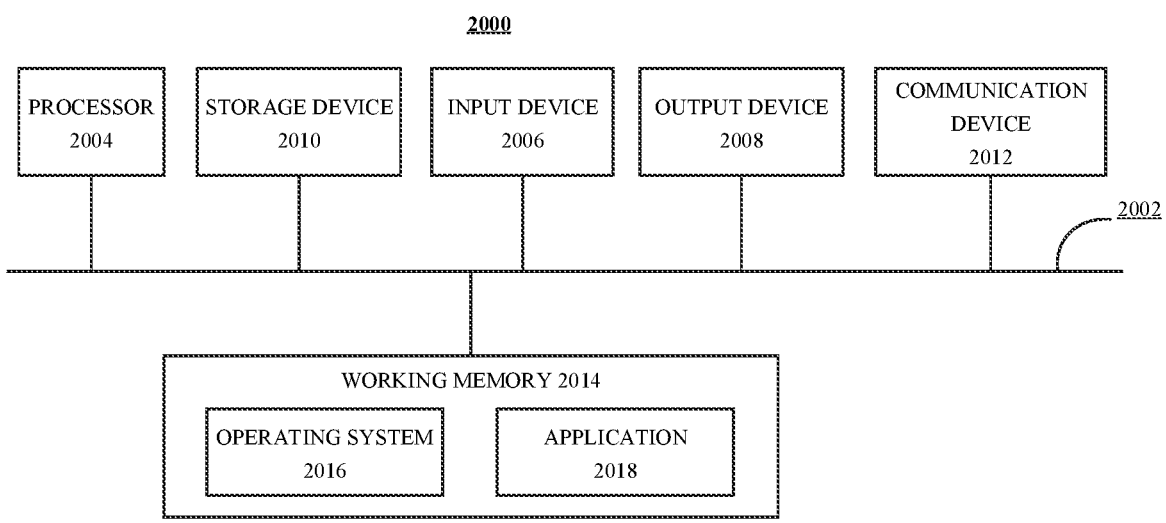
FIG. 5 is a structural block diagram showing an example computing device that can be applied to some embodiments.

Referring to FIG. 5, a computing device 2000 is now described, which is an example of a hardware device (an electronic device) that may be applied to various aspects of the present disclosure. The computing device 2000 may be any machine configured to perform processing and/or computation, which may be, but is not limited to, a workstation, a server, a desktop computer, a laptop computer, a tablet computer, a personal digital assistant, a robot, a smartphone, an onboard computer, or any combination thereof. The foregoing meme package generation method may be implemented, in whole or at least in part, by the computing device 2000 or a similar device or system.

The computing device 2000 may comprise elements in connection with a bus 2002 or in communication with a bus 2002 (possibly via one or more interfaces). For example, the computing device 2000 may comprise the bus 2002, one or more processors 2004, one or more input devices 2006, and one or more output devices 2008. The one or more processors 2004 may be any type of processors, and may include, but are not limited to, one or more general-purpose processors and/or one or more special processors (e.g., special processing chips). The input device 2006 may be any type of device capable of inputting information to the computing device 2000, and may include, but is not limited to, a mouse, a keyboard, a touch screen, a microphone and/or a remote controller. The output device 2008 may be any type of device capable of presenting information, and may include, but is not limited to, a display, a speaker, a video/audio output terminal, a vibrator, and/or a printer. The computing device 2000 may also include a non-transitory storage device 2010 or be connected to a non-transitory storage device 2010. The non-transitory storage device may be non-transitory and may be any storage device capable of implementing data storage, and may include, but is not limited to, a disk drive, an optical storage device, a solid-state memory, a floppy disk, a flexible disk, a hard disk, a magnetic tape, or any other magnetic medium, an optical disc or any other optical medium, a read-only memory (ROM), a random access memory (RAM), a cache memory and/or any other memory chip or cartridge, and/or any other medium from which a computer can read data, instructions and/or code. The non-transitory storage device 2010 can be removed from an interface. The non-transitory storage device 2010 may have data/programs (including instructions)/code for implementing the foregoing methods and steps. The computing device 2000 may further comprise a communication device 2012. The communication device 2012 may be any type of device or system that enables communication with an external device and/or network, and may include, but is not limited to, a modem, a network card, an infrared communication device, a wireless communication device and/or a chipset, e.g., a Bluetooth™ device, a 1302.11 device, a Wi-Fi device, a WiMAX device, a cellular communication device, and/or the like.

The computing device 2000 may further comprise a working memory 2014, which may be any type of working memory that may store programs (including instructions) and/or data useful to the working of the processor 2004, and may include, but is not limited to, a random access memory and/or read-only memory device.

Software elements (programs) may be located in the working memory 2014, and may include, but is not limited to, an operating system 2016, one or more application programs 2018, drivers, and/or other data and code. The instructions for performing the foregoing methods and steps may be comprised in the one or more application programs 2018, and the foregoing meme package generation methods can be implemented by the processor 2004 by reading and executing instructions of the one or more application programs 2018. More specifically, in the foregoing meme package generation method, step S101 to step S104 may be implemented, for example, by the processor 2004 by executing the application program 2018 having instructions of step S101 to step S104. Moreover, other steps of the foregoing meme package generation method may be implemented, for example, by the processor 2004 by executing the application program 2018 having instructions for performing corresponding steps. Executable code or source code of the instructions of the software elements (programs) may be stored in a non-transitory computer-readable storage medium (for example, the foregoing storage device 2010), and may be stored in the working memory 2014 when executed (may be compiled and/or installed). The executable code or source code of the instructions of the software elements (programs) may also be downloaded from a remote location.

It should further be appreciated that various variations may be made according to specific requirements. For example, tailored hardware may also be used, and/or specific elements may be implemented in hardware, software, firmware, middleware, microcode, hardware description languages, or any combination thereof. For example, some or all of the disclosed methods and devices may be implemented by programming hardware (for example, a programmable logic circuit including a field programmable gate array (FPGA) and/or a programmable logic array (PLA)) in an assembly language or a hardware programming language (such as VERILOG, VHDL, and C++) by using the logic and algorithm in accordance with the present disclosure.

It should be further understood that the foregoing methods may be implemented in a server-client mode. For example, the client may receive data input by a user and send the data to the server. Alternatively, the client may receive data input by the user, perform a part of processing in the foregoing method, and send data obtained after the processing to the server. The server may receive the data from the client, perform the foregoing method or another part of the foregoing method, and return an execution result to the client. The client may receive the execution result of the method from the server, and may present same to the user, for example, through an output device.

It should further be understood that the components of the computing device 2000 can be distributed over a network. For example, some processing may be executed by one processor while other processing may be executed by another processor away from the one processor. Other components of the computing system 2000 may also be similarly distributed. As such, the computing device 2000 can be interpreted as a distributed computing system that performs processing at a plurality of locations.

Although the embodiments or examples of the present disclosure have been described with reference to the drawings, it should be appreciated that the methods, systems and devices described above are merely illustrative embodiments or examples, and the scope of the present invention is not limited by the embodiments or examples, but only defined by the appended authorized claims and equivalent scopes thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A computer-implemented method, comprising:
    acquiring at least one piece of target feedback information for a plurality of related videos associated with a target video, wherein the target video and the plurality of related videos are related to the same video producer;
    matching the at least one piece of target feedback information with the target video;
    determining at least one target video clip from the target video based on a matching result, wherein the at least one target video clip comprises a first target video clip used to generate an animated meme particular to the video producer;
    performing object recognition on each of the at least one target video clip;
    determining, based on an object recognition result, whether the target video clip contains a representation of the video producer;
    determining, in response to determining that the target video clip contains a representation of the video producer, the target video clip as the first target video clip; and
    generating a meme package at least based on the at least one target video clip, the meme package being particular to the video producer, wherein the meme package comprises the animated meme, and wherein generating the meme package comprises generating the animated meme based on at least the first target video clip.

2. The method according to claim 1, wherein generating the animated meme comprises:
    determining first text information corresponding to the first target video clip; and
    generating the animated meme based on the first target video clip and the first text information.

3. The method according to claim 2, wherein the first text information is determined based on text corresponding to a subtitle or an audio in the first target video clip.

4. The method according to claim 1, wherein generating the animated meme is performed in response to receiving a first trigger instruction.

5. The method according to claim 1, wherein the meme package further comprises a sticker particular to the video producer, and the at least one target video clip comprises a second target video clip;
the method further comprising:
determining, in response to determining that the target video clip does not contain a representation of the video producer, the target video clip as the second target video clip; and
wherein generating the meme package further comprises:
determining second text information corresponding to the second target video clip; and
generating the sticker based on at least the second text information.

6. The method according to claim 5, wherein generating the sticker comprises:
acquiring a facial image related to the target video; and
generating the sticker based on the second text information and the facial image.

7. The method according to claim 5, wherein the second text information is determined based on text corresponding to a subtitle or an audio in the second target video clip.

8. The method according to claim 1, further comprising:
generating, in response to receiving a second trigger instruction, a meme based on a preset video clip that is user selected, the meme being particular to the video producer.

9. The method according to claim 1, wherein acquiring the at least one piece of target feedback information comprises:
acquiring the at least one piece of feedback information for each of the plurality of related videos;
performing semantic matching on a plurality of pieces of feedback information for the plurality of related videos;
dividing the plurality of pieces of feedback information into a plurality of feedback information groups based on a semantic matching result;
determining, from the plurality of feedback information groups, at least one feedback information group in which the number of pieces of feedback information comprised is greater than a threshold as a target feedback information group; and
determining, based on a plurality of pieces of feedback information in each of the target feedback information groups, the target feedback information corresponding to the target feedback information group.

10. The method according to claim 1, further comprising:
before acquiring the at least one piece of target feedback information, determining whether the total number of pieces of feedback information for the plurality of related videos is not less than a preset value; and
pushing guidance information in response to determining that the total number is less than the preset value, so as to guide a user to input feedback information for the target video.

11. The method according to claim 1, wherein matching the at least one piece of target feedback information with the target video comprises:
performing semantic matching between each of the at least one piece of target feedback information and text corresponding to at least part of a subtitle or at least part of an audio in the target video, and
wherein determining the at least one target video clip is performed based on a result of the semantic matching.

12. The method according to claim 1, further comprising:
matching one or more memes in the meme package with a preset video;
determining, based on a matching result, at least one meme that matches the preset video; and
determining, based on the matching result, at least one matching video clip in the preset video that matches respective ones of the at least one meme, so that during playing of the preset video, a meme corresponding to a matching video clip is capable of being pushed while the matching video clip is played.

13. The method according to claim 12, further comprising:
establishing an association database for the meme package, wherein the association database comprises a correlation between the at least one meme and the at least one matching video clip.

14. The method according to claim 13, further comprising:
acquiring play time information of the at least one matching video clip,
wherein the association database further comprises a correlation between the at least one matching video clip and the play time information.

15. The method according to claim 12, wherein the preset video and the target video are related to the same video producer.

16. An electronic device, comprising:
one or more processors; and
a memory storing one or more programs configured to be executed by the one or more processors, the one or more programs comprising instructions for performing operations comprising:
acquiring at least one piece of target feedback information for a plurality of related videos associated with a target video, wherein the target video and the plurality of related videos are related to the same video producer;
matching the at least one piece of target feedback information with the target video;
determining at least one target video clip from the target video based on a matching result, wherein the at least one target video clip comprises a first target video clip used to generate an animated meme particular to the video producer;
performing object recognition on each of the at least one target video clip;
determining, based on an object recognition result, whether the target video clip contains a representation of the video producer;
determining, in response to determining that the target video clip contains a representation of the video producer, the target video clip as the first target video clip; and
generating a meme package at least based on the at least one target video clip, the meme package being particular to the video producer, wherein the meme package comprises the animated meme, and wherein generating the meme package comprises generating the animated meme based on at least the first target video clip.

17. The electronic device according to claim 16, wherein the meme package further comprises a sticker particular to the video producer, and the at least one target video clip comprises a second target video clip, wherein the one or more programs further comprise instructions for performing operations comprising:

determining, in response to determining that the target video clip does not contain a representation of the video producer, the target video clip as the second target video clip, and wherein generating the meme package further comprises:

determining second text information corresponding to the second target video clip; and generating the sticker based on at least the second text information.

18. A non-transitory computer-readable storage medium, storing one or more programs comprising instructions that, when executed by one or more processors of a computing device, cause the computing device to perform operations comprising:

acquiring at least one piece of target feedback information for a plurality of related videos associated with a target video, wherein the target video and the plurality of related videos are related to the same video producer;

matching the at least one piece of target feedback information with the target video;

determining at least one target video clip from the target video based on a matching result, wherein the at least one target video clip comprises a first target video clip used to generate an animated meme particular to the video producer;

performing object recognition on each of the at least one target video clip;

determining, based on an object recognition result, whether the target video clip contains a representation of the video producer;

determining, in response to determining that the target video clip contains a representation of the video producer, the target video clip as the first target video clip; and generating a meme package at least based on the at least one target video clip, the meme package being particular to the video producer, wherein the meme package comprises the animated meme, and wherein generating the meme package comprises generating the animated meme based on at least the first target video clip.

* * * * *